Patented May 1, 1945

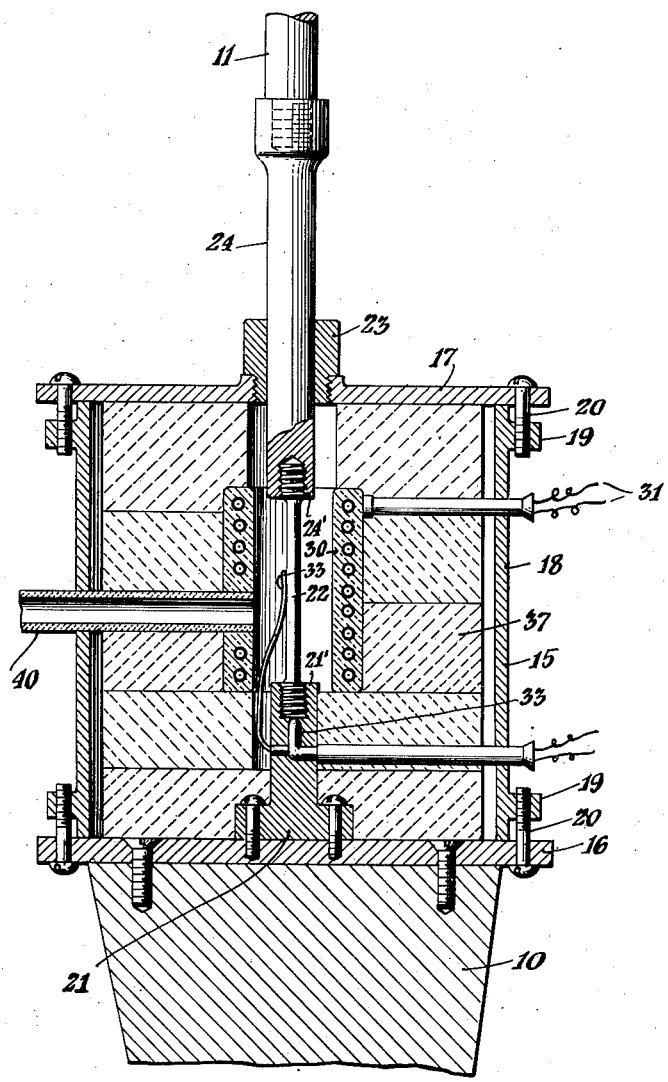

2,375,032

UNITED STATES PATENT OFFICE 2,375,032

TENSILE STRENGTH TESTING APPARATUS

Robert M. Parke and Frederick P. Bens, Detroit, Mich., assignors to Climax Molybdenum Company, New York, N. Y., a corporation of Delaware Application May 5, 1943, Serial No. 485,711

4 Claims. (Cl. 73—95)

The present invention relates to testing apparatus and more particularly to testing apparatus for measuring tensile strength at elevated temperatures.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates the present preferred embodiment of the invention, and together with the description, serves to explain the principles of the invention.

The single figure of the drawing is a vertical section showing a typical and illustrative embodiment of the present invention.

The present invention has for its object the provision of a novel and improved testing apparatus particularly adapted for measuring tensile strength at elevated temperatures. A further object of the invention is the provision of an accurate, convenient and easily operated apparatus by which the tensile strength of a sample may be determined at relatively high temperatures. Still another object of the invention is the provision of a tensile strength testing apparatus which preserves the sample and apparatus against deterioration while the sample is being tested.

In accordance with the present invention there is provided a specimen holder for supporting and securely anchoring the sample to be tested and the holder is surrounded by a relatively strong chamber which can be rendered air-tight and subjected to a high degree of vacuum. Above the specimen holder and mounted for axial movement within the chamber is a plunger at the lower end of which is mounted means for securely engaging and clamping the upper end of the specimen so located as to be movable toward and away from the other specimen holder so as to exert tension on the specimen. The plunger is preferably mounted for free movement in a tightly fitted sleeve, and the plunger and sleeve are both preferably made of some material having a negligible temperature coefficient of expansion so that the fit remains substantially unchanged over a wide temperature range. The plunger is rigidly connected to the usual tensioning mechanism, while the specimen holder is firmly secured to the stationary base of the machine so that a predetermined or measurable load may be applied to the specimen.

Surrounding the holder and the specimen are provided heating means by which the holder, specimen and plunger are brought to the desired temperature, and thermocouples are preferably mounted on the specimen and lead to registering instruments externally of the chamber so that the temperature of the specimen may be accurately determined. Between the specimen and the wall of the chamber is provided refractory and insulating material so as to keep the exterior of the apparatus as cool as possible and to minimize the heat loss from the heating element.

The chamber and insulating and refractory elements are apertured and provided with leads to the heating elements and thermocouples, and another aperture may conveniently serve for the connection to the vacuum pump or other means by which the interior of the chamber is exhausted. The exhaustion of the chamber not only prevents corrosion of the specimen at high temperatures, but also prevents deterioration of the holder and plunger when they are subjected to temperatures in the neighborhood of 1500° F. Preferably the apparatus is constructed with separable top and bottom portions and the refractory material is made in several sections so that the apparatus may be easily disassembled for replacement of the heating element or other repairs.

It will be understood that the foregoing general description and the following detailed description as well are exemplary and explanatory of the invention but are not restrictive thereof.

Referring now in detail to the present preferred and illustrative embodiment of the invention as shown in the accompanying drawing, the invention is shown as adapted for use with a conventional form of tension testing apparatus having a base or foundation member 10 and a tensioning plunger 11 which may be raised and lowered with reference to the stage and may be accurately controlled so as to exert a predetermined tension load on the specimen. On the upper surface of the base 10 is mounted the chamber 15 which comprises a bottom plate 16, a top plate 17 and a cylindrical wall portion 18, the top and bottom plates and the cylindrical wall preferably being made of steel of substantial thickness. These parts are held together by means of the screws 20 passing through suitable apertures in the top and bottom plates 16 and 17 and lugs 19 attached to the cylinder wall 18, a sufficient number of the tie bolts being provided to firmly hold the plates against the top and bottom edges of the cylindrical wall 18 and to hold the apparatus to the foundation member 10. The plates 16 and 17 are surface ground on both sides and are accurately fitted to the top and bottom edges of the cylinder 18 so as to be parallel with each other and at the same time provide air-tight joints.

A specimen holder 21 is securely attached to the upper surface of the bottom plate 16 and is provided with a threaded socket 21' at its upper end to receive the threaded end of a specimen 22. This holder is preferably made of a material which is corrosion resistant such as stainless steel. In the upper plate 17 is threaded a sleeve 23 within which slides a plunger 24 having at its lower end a threaded socket 24' to be screwed onto the upper end of the specimen 22. The plunger is preferably coaxial with the holder 21, and when raised will tension the specimen held in the socket 21'. The plunger 24 and sleeve 23 are preferably formed of material having a negligible coefficient of expansion such as invar, and the plunger is closely fitted within the sleeve so that while it may move freely axially thereof and there is no substantial drag on its movement, the joint between the plunger and the sleeve is substantially air-tight even at a relatively high vacuum.

The plunger 24 is connected to the tensioning plunger 11 of a tensile strength testing machine in any desired manner so that the specimen may be subjected to the desired load.

Heating means are provided surrounding the socket, specimen and plunger 11 and as illustratively embodied comprise the heating coil 30 of generally cylindrical shape which is supplied with power through sealed furnace leads 31. Thermocouples 33 are mounted at the upper, inner surface of the socket 21', preferably in contact with, or close to, the specimen 22, intermediate its ends, and adjacent to the upper end of the specimen and their leads 34 are likewise sealed in the chamber wall 18 so as to prevent air leakage.

Heat insulation and refractory material are provided between the heating coil 30 and the cylindrical wall member 18 and may comprise the refractory bricks 37 which substantially fill the space between the heating coil and the wall member 18.

Means are provided for exhausting the air from the chamber and includes a duct comprising a refractory tube 40 which extends from outside the casing through the refractory 37 and the heater 30. At its outer end, the tube may be connected to a vacuum pump by means of a rubber tube.

In using the apparatus, the sleeve is unscrewed and the specimen 22 is introduced into the chamber 15 and is screwed into sockets 21' and 24' by turning the plunger 11 after which sleeve 23 may be replaced and screwed in place. The entire chamber is then exhausted until the pressure has been reduced to the desired value which is preferably about 75 microns (mercury gage). The power is turned on supplying current to the heating coil 30, and the power is adjusted to produce the desired temperature which is determined by the thermocouples 33.

After the temperature has reached equilibrium at the desired temperature which may be adjusted by varying the power supplied to the heating coil 30, the tension applying means are set in motion to raise the plungers 11 and 24 to exert the desired load on the specimen 22. The load may continue to be applied as long as desired while maintaining the proper temperature and vacuum, and may be increased in accordance with the desired testing conditions. If desired, the tension may be increased, of course, until the specimen fails. The power supply to the heating coil 30 is then discontinued and the furnace is allowed to cool down to approximately room temperature.

When sufficiently cool, air may be admitted to the chamber and the specimen removed by unscrewing the sleeve 23.

The invention in its broader aspects is not limited to the specific parts and combinations shown and described but departures may be made therefrom within the scope of the accompanying claims without departing from the principles of the invention and without sacrificing its chief advantages.

What we claim is:

1. A tensile strength testing machine for use at relatively high temperatures including in combination a chamber, means within the chamber for holding one end of a specimen, means for heating the specimen, refractory elements between the specimen and the chamber wall, and a plunger above the specimen to which the specimen may be attached, said chamber being provided with a fitted sleeve to receive the axially movable plunger, said sleeve and plunger being formed of material having an extremely small coefficient of thermal expansion and means for evacuating the chamber whereby the heating and test may be carried out under a high vacuum.

2. A tensile strength testing machine for use at relatively high temperatures including in combination a chamber having a cylindrical wall portion and tightly fitted top and bottom ends, means supported on the bottom end for receiving and securely holding a specimen, a resistance heater surrounding the support and specimen, heat insulation between the heater and chamber wall and ends, a plunger above the support carrying means to engage and securely hold the specimen and a sleeve in the upper end and in which the plunger is axially movable and tightly fitted, a vacuum pump connection to the chamber for evacuating the chamber.

3. An apparatus for testing materials at high temperatures comprising a casing, an annular electrical resistance unit disposed within the casing and forming a test chamber, means for exhausting air from said chamber, a specimen holder at the lower end of the test chamber, the casing having an opening therein above the test chamber and in line with the holder, an elongated bearing and guide sleeve closing the opening and having a bore of continuously uniform diameter, and a test plunger extending into the chamber through the bore of the sleeve and axially movable in the chamber and sleeve, said sleeve extending a substantial distance above the casing to accurately guide the plunger and stably support the same against lateral deflection, said plunger having a tight sealing engagement with the wall of the bore of the sleeve and the plunger and sleeve being formed of material having an extremely small coefficient of thermal expansion.

4. A tensile strength testing machine for use at high temperatures comprising a casing, an annular electrical resistance unit disposed within the casing and forming a test chamber, insulating means electrically and thermally insulating the chamber from the walls of the casing, means for exhausting air from the test chamber, a holder at the base of the test chamber adapted to engage and hold one end of a specimen to be tested, the casing having an aperture above the chamber and in line with the holder through which the specimen may be inserted and removed, an axially movable plunger adapted to engage the other end of the specimen, and a bearing and guide sleeve closing the aperture and through which the plunger is mounted to slide with a tight sealing fit.

ROBERT M. PARKE.
FREDERICK P. BENS.